(12) United States Patent
Zhang et al.

(10) Patent No.: US 9,359,914 B2
(45) Date of Patent: Jun. 7, 2016

(54) SILENCING AND COOLING ASSEMBLY WITH FIBROUS MEDIUM

(71) Applicant: General Electric Company, Schenectady, NY (US)

(72) Inventors: Hua Zhang, Greer, SC (US); Valery Ivanovich Ponyavin, Greenville, SC (US); Joshua Shane Sater, Anderson, SC (US); Jianmin Zhang, Oklahoma City, OK (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 14/462,845

(22) Filed: Aug. 19, 2014

(65) Prior Publication Data

US 2016/0053637 A1    Feb. 25, 2016

(51) Int. Cl.
*F02K 1/38* (2006.01)
*F01K 7/16* (2006.01)
*F01D 25/12* (2006.01)

(52) U.S. Cl.
CPC .. *F01K 7/16* (2013.01); *F01D 25/12* (2013.01)

(58) Field of Classification Search
CPC .......................................................... F02K 1/38
USPC ........................................................ 181/220
See application file for complete search history.

(56) References Cited

U.S. PATENT DOCUMENTS

| | | | |
|---|---|---|---|
| 4,738,305 A | 4/1988 | Bacchus | |
| 5,394,786 A * | 3/1995 | Gettle et al. | 86/50 |
| 8,534,039 B1 * | 9/2013 | Pierson et al. | 60/39.182 |
| 8,579,074 B2 | 11/2013 | Kosaka et al. | |
| 2006/0185931 A1 * | 8/2006 | Kawar | 181/202 |
| 2007/0151278 A1 * | 7/2007 | Jarvis | 62/310 |
| 2008/0067000 A1 * | 3/2008 | Heiland | 181/284 |
| 2008/0093159 A1 * | 4/2008 | Copley et al. | 181/204 |
| 2010/0224438 A1 * | 9/2010 | Schulze et al. | 181/204 |
| 2010/0258377 A1 * | 10/2010 | Cash et al. | 181/258 |
| 2012/0031596 A1 * | 2/2012 | Kippel et al. | 165/168 |
| 2014/0360217 A1 * | 12/2014 | Nicholas | 62/314 |

OTHER PUBLICATIONS

Cooling Media.com, CELdek Media, 2014, 2 pages, Munters Original Cooling Media.
Cooling Media.com, GLASdek Media, 2014, 2 pages, Munters Original Cooling Media.

* cited by examiner

*Primary Examiner* — Forrest M Phillips
(74) *Attorney, Agent, or Firm* — Ernest G. Cusick; Hoffman Warnick LLC (57) ABSTRACT

Embodiments of the present disclosure provide an assembly including a fibrous medium having a plurality of substantially corrugated channels therein, the plurality of substantially corrugated channels being permeable to a flow of fluid therethrough; a distributor in contact with the fibrous medium, and including an aperture therein for transmitting a liquid coolant through the distributor; and at least two acoustic shields coupled to the fibrous medium and proximal to opposing sides of the distributor.

20 Claims, 9 Drawing Sheets

SILENCING AND COOLING ASSEMBLY WITH FIBROUS MEDIUM

BACKGROUND OF THE INVENTION

The disclosure relates generally to noise reduction and cooling a working fluid, such as the inlet air of a turbomachine. More specifically, the disclosure relates to assemblies with a fibrous medium which provide turbine noise reduction in addition to cooling.

Conventional turbine systems are frequently used to generate power for, e.g., electric generators. A working fluid, such as hot gas or steam can be forced across sets of turbine blades, which are coupled to a rotor of the turbine system. The force of the working fluid on the blades causes those blades (and the coupled body of the rotor) to rotate. In many cases, the rotor body is coupled to the drive shaft of a dynamoelectric machine such as an electric generator. In this sense, initiating rotation of the turbine system rotor can also rotate the drive shaft in the electric generator to generate an electrical current (associated with a power output).

Variables such as the turbine's efficiency, power output, and risk of failure are at least partially dependent on the internal temperature of particular components and passages, such as inlets, outlets, etc. The temperature of a working fluid flowing through the turbine system will affect outputs, such as the rotation torque and/or power generated. Designing a turbine system to have a particular operating temperature can improve these outputs. The process of controlling operating temperatures to increase the power output of a system can be known as "turbine power augmentation." To manage the temperature of a turbine system, various cooling systems may be deployed.

Another set of variables which can affect the turbine's performance and safety, particularly in a gas turbine, are dynamic outputs (i.e., noise) produced by the turbine during operation. The amount of noise produced may be greater in a land based gas turbine than in other types of turbomachinery because of different operational characteristics, e.g., higher compressor rotor tip speed. Thus, some materials or components of a turbine may be designed or selected based on their ability to suppress acoustic waves.

BRIEF DESCRIPTION OF THE INVENTION

Silencing and cooling assemblies which incorporate a fibrous medium are discussed herein. Although embodiments of the disclosure are discussed by example herein relative to turbine applications, it is understood that embodiments of the present disclosure may be applied to other situations, e.g., any machine with an air passage to receive temperature cooling and acoustic suppression.

A first aspect of the invention provides an assembly, which may include a fibrous medium having a plurality of substantially corrugated channels therein, the plurality of substantially corrugated channels being permeable to a flow of fluid therethrough; a distributor in contact with the fibrous medium, and including an aperture therein for transmitting a liquid coolant through the distributor; and at least two acoustic shields coupled to the fibrous medium and proximal to opposing sides of the distributor.

A second aspect of the invention provides a turbine component including: a passage configured to transmit a flow of air from a compressor; a fibrous medium positioned within the passage, the fibrous medium having a plurality of substantially corrugated channels therein, wherein each of the plurality of substantially corrugated channels is permeable to the flow of air; a distributor in contact with the fibrous medium, and including an aperture therein for transmitting a liquid coolant through the distributor; and at least two acoustic shields coupled to the fibrous medium and proximal to opposing sides of the distributor.

A third aspect of the invention provides a combined cycle power generation system including an assembly positioned within a fluid flow section one of a gas turbine, a heat recovery stream generator (HRSG), and a steam turbine, the assembly including: a fibrous medium having a plurality of substantially corrugated channels therein, the substantially corrugated channels being permeable to a flow of fluid therethrough, a distributor in contact with the fibrous medium, and including an aperture therein for transmitting a liquid coolant through the distributor; and at least two acoustic shields coupled to the fibrous medium and proximal to opposing sides of the distributor.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to providing cooling and acoustic suppression of mechanical systems and equipment. More particularly, as discussed herein, aspects of the invention relate to a silencing and cooling assembly with a fibrous medium.

Figure 1:
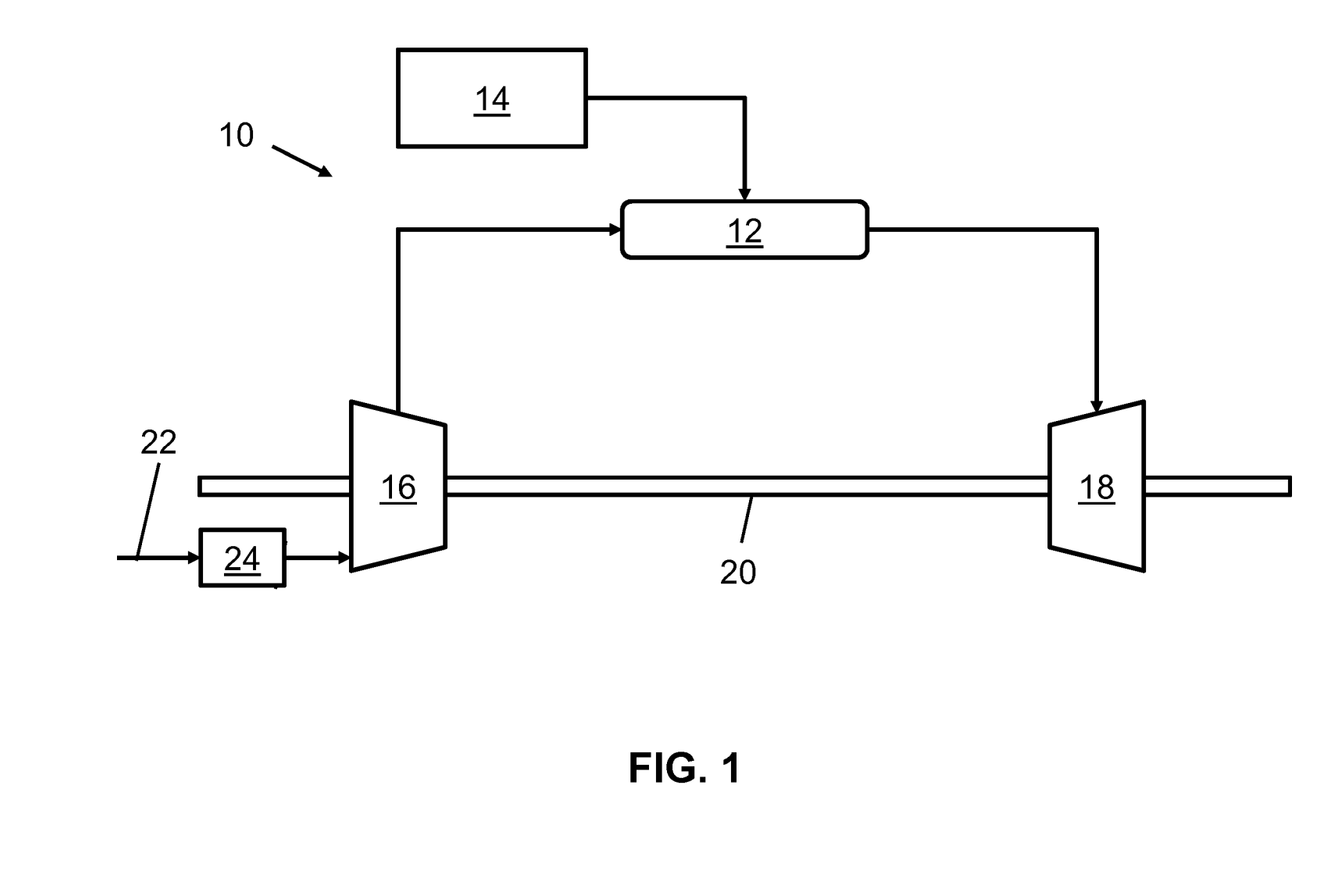
FIG. 1 is a schematic view of a power generation according to an embodiment of the present disclosure.

Referring to FIG. 1, a power generation system 10 in the form of a turbomachine is shown. Power generation system 10 is shown by example as being a combustion-based turbomachine assembly, though embodiments of the present disclosure can also be adapted for use with other types of turbomachines (steam turbines, wind turbines, water turbines, etc.). In combustion-based turbomachines, a combustor 12, connected to a fuel nozzle 14, is typically located between the compressor 16 and turbine 18 sections of power generation system 10. Compressor 16 and turbine 18 can be mechanically coupled to each other through a rotatable shaft 20. Air 22 flows sequentially through compressor 16, combustor 12, and lastly through turbine 18. The compression provided from compressor 16 can also increase the temperature of air 22. Fuel nozzle 14 can provide fuel which combusts in the presence of air 22 in combustor 12 to yield a hot gas stream. Combustion reactions in combustor 12 produce acoustic waves as a dynamic output. The hot gas stream can enter turbine 18 to impart mechanical energy to rotatable shaft 20, thereby delivering power back to compressor 16 and/or any loads (not shown) coupled to rotatable shaft 20. Power generation system may include a passage positioned between compressor 16 and combustor 12, though which air compressed in compressor 16 passes before being combusted. Power generation system 10 may be one of several individual turbomachines controlled via the same operator and/or may be part of a larger power generation system. Larger machine systems which can include power generation system 10 are discussed in detail elsewhere herein.

Figure 2:
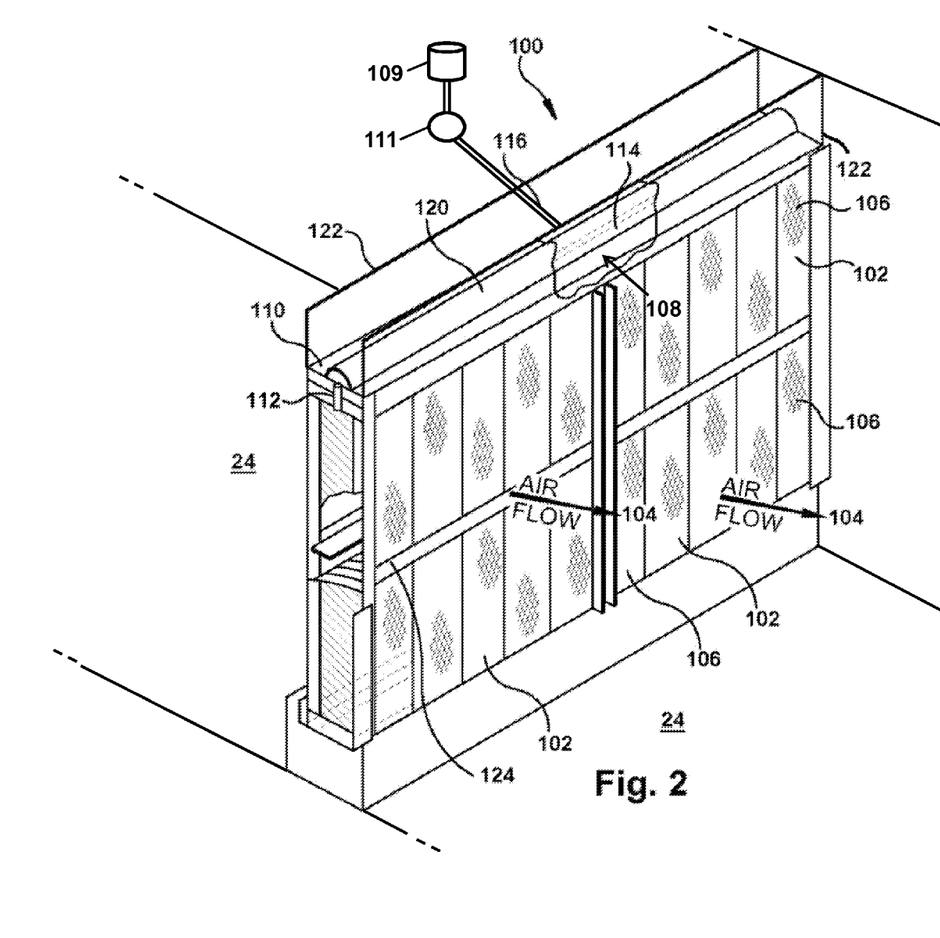
FIG. 2 is a perspective view of a silencing and cooling assembly according to an embodiment of the present disclosure.

Referring to FIG. 2, an assembly 100 according to embodiments of the present disclosure is shown. Embodiments of assembly 100 can suppress noise produced from a turbine system in addition to absorbing heat from fluids passing between components of power generation system 10 (FIG. 1) (e.g., cooling inlet air passing through passage (FIG. 1) between compressor 16 (FIG. 1) and combustor 12 (FIG. 1)). With respect to power generation system 10 (FIG. 1), the compressor 16 (FIG. 1) may produce acoustic waves of significant volume (i.e., a ratio of sound pressures between approximately thirty and fifty decibels (dB)) from power generation system 10 (FIG. 1). Embodiments of assembly 100 can suppress these acoustic waves and prevent them from affecting other components, apparatuses, etc. located outside of power generation system 10 (FIG. 1), and to meet power plant noise requirements. In addition, embodiments of assembly 100 can cool compressed fluids for compressor 16 (FIG. 1), which increase in temperature after being compressed. Assembly 100 combines, the features of cooling a stream of air within passage 24 with acoustic suppression of sound waves also traversing passage 24.

In operation, assembly 100 can cool fluids within passage 24 while suppressing acoustic waves which would otherwise exit a machine (e.g., power generation system 10) though passage 24. Although particular embodiments of assembly 100 are shown in the accompanying FIGURES and discussed by example herein, it is understood that assembly 100 can include a variety of structures employing the same or similar concepts. Assembly 100 can include a medium (e.g., several sheets, a mesh, a slab, or other layer) of fibers positioned substantially throughout a cross section of passage 24. Space between the fibers of the medium can create several channels through the medium of assembly 100, through which fluids within passage 24 can pass. These channels can be substantially corrugated, such that acoustic waves within passage 24 have no direct line of passage, and are suppressed or blocked, or at least attenuated by the fibrous medium of assembly 100. Spaces between fibers of the fibrous medium also allow cooling fluids to be distributed throughout the fibrous medium of assembly 100, which can absorb heat energy from fluids within passage 24.

Assembly 100 can also include a supply system for delivering liquid coolants to the fibrous medium of assembly 100, including the substantially corrugated channels therein. In operation, liquid coolants can be distributed throughout the fibrous material within assembly 100 by flowing through spaces between individual fibers of the material. In a particular embodiment, the liquid coolant can be water or another type of evaporative coolant. Fluids can flow through the substantially corrugated channels of the medium and transfer energy to the coolant, causing some of the distributed coolant to evaporate. This transfer of energy from fluid to liquid coolants distributed throughout assembly 100 can reduce the temperature of fluids within passage 24. Unevaporated liquid coolants can optionally be collected in a trough at the bottom of assembly 100 and diverted (e.g., by a pump, siphon, conduit, etc.) back to the supply system and/or other components.

Assembly 100, including a fibrous medium 102 therein, can be positioned within a path through which a fluid 104 flows, e.g., a flow of air through passage 24 of power generation system 10 (FIG. 1), such as a turbine. Assembly 100 can be affixed within, coupled to, or otherwise attached to the structure of passage 24 by any currently known or later developed coupling mechanism. Fibrous medium 102 can be composed of any currently known or later developed fibrous material(s), and as non-limiting examples can include fiber-based membranes, polymeric sheets or lamina, cellulose-based materials, glass-based fibers, mineral fibers, composite materials which include any of the substances disclosed herein and/or other materials, etc. In an example embodiment, fibrous medium 102 can have a density of between approximately forty kilograms per cubic meter ($kg/m^3$) and approximately four-hundred and fifty $kg/m^3$, with a fiber diameter of between approximately five micrometers ($\mu m$) and approximately fifty $\mu m$. Fibrous medium 102 can be selected, modified, manufactured, etc. to include several substantially corrugated channels 106 therein, which can transmit the flow of fluid 104 through fibrous medium 102.

Assembly 100 can also include a coolant supply system 108 adjacent to fibrous medium 102. Coolant supply system 108 can deliver liquid coolants pumped from a reservoir 109 to fibrous material 102 to absorb heat energy from fluid 104. In an example embodiment, coolant supply system 108 of assembly 100 can also be located within passage 24 of power generation system 10 (FIG. 1).

Figure 3:
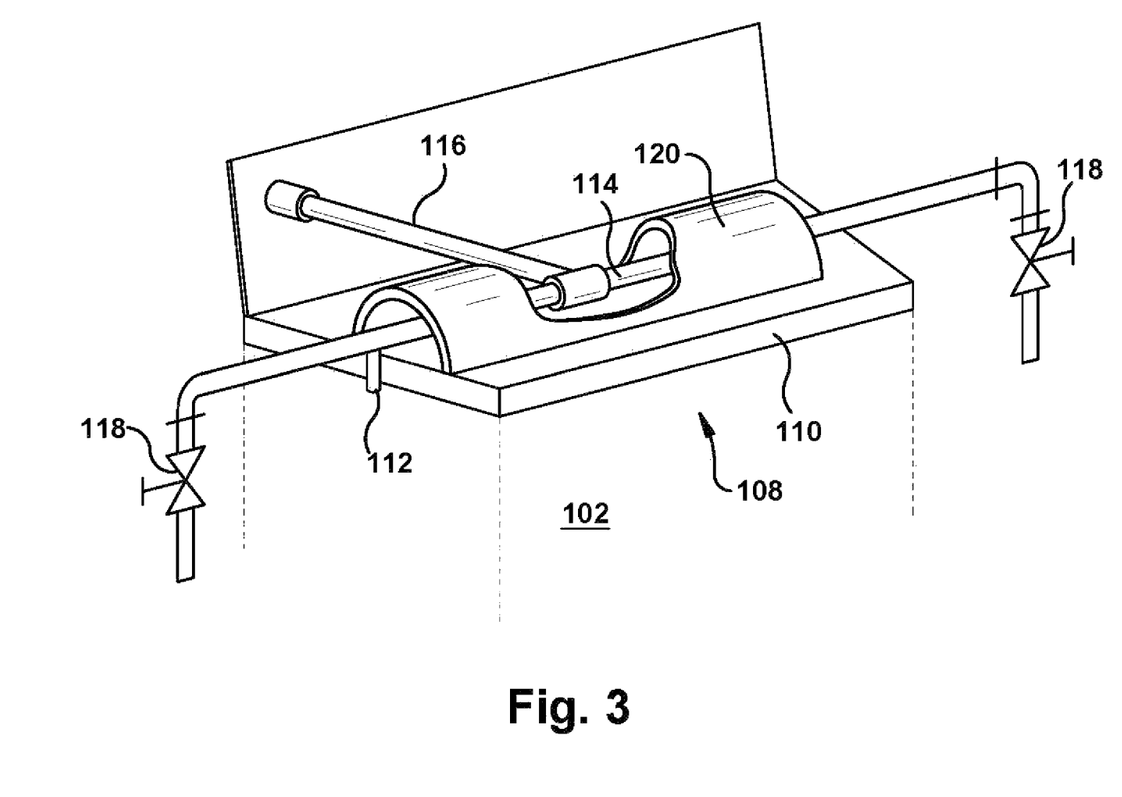
FIG. 3 is a perspective view of a coolant supply system according to an embodiment of the present disclosure.

Turning briefly to FIG. 3, coolant supply system 108 and its components are shown in further detail. Coolant supply system 108 can include a distributor 110 in contact with fibrous medium 102. Distributor 110 can be in the form of any currently known or later developed component for transmitting fluids, including liquids, from one component, chamber, etc. into another. Distributor 110 is shown by example in FIGS. 2 and 3 as being in the form of a pad, though other embodiments are also contemplated. For example, distributor 110 can be in the form of a chamber, several perforations, a perforated pipe, semi-permeable material or group of materials, etc. Distributor 110 can include an aperture 112 which transmits liquid coolants through distributor 110 to fibrous medium 102. More specifically, aperture 112 can provide fluid communication between fibrous medium 102 and a coolant pipe 114 coupled to distributor 110.

A reservoir 109 can store a predetermined amount of liquid coolants to be distributed across fibrous medium 102 or diverted to other components. A pump 111 can deliver the liquid coolants within reservoir 109 to coolant pipe 114. FIG. 2 includes, and the present disclosure discusses, coolant pipe 114 as a particular example, but it is understood that coolant pipe 114 can additionally or alternatively be in the form of any currently known or later developed mechanical device for storing and/or transmitting fluids. Although aperture 112 can be visible to a human observer as shown in FIGS. 2 and 3, it is also understood that an embodiment of distributor 110 can include selectively permeable materials (e.g., filter materials and/or carbon-based substances) with a plurality of apertures 112 therein which are invisible to a human observer. As non-limiting examples, coolant pipe 114 can transmit liquid coolants such as: an antifreeze, water, an evaporative coolant, an antifreeze-water solution, and/or other currently known or later developed materials with similar heat transfer properties. Coolants provided from coolant supply system 108 can travel laterally through sheets of fibrous medium 102 by passing through gaps and/or portions of fibrous medium 102 which are permeable to liquids. Some coolants delivered to fibrous medium 102 can include coolants for evaporative cooling. Evaporative cooling refers to a process which uses a coolant material with a high heat of vaporization (e.g., water, with a heat of vaporization of 40.68 kilojoules per mole) to cool a flowing fluid, such as air. In evaporative cooling, a fluid can transfer energy to the coolant to evaporate the coolant, thereby reducing the temperature of the fluid.

An intake line 116 can transmit coolants pumped from reservoir 109 with pump 111 into coolant pipe 114 of coolant supply system 108. Intake line 116 is shown by example as being in the form of a single conduit, but any number of conduits is possible, and intake line 116 can also be in the form of other structures for transmitting a coolant. Coolants which do not enter to fibrous medium 102 through distributor 110 can be selectively flushed from coolant supply system 108 through one or more flush lines 118 in fluid communication with coolant pipe 114. Flush lines 118 can be coupled to coolant pipe 114 to control the flow of liquid coolants from coolant pipe 114 into distributor 110 during operation. Though two flush lines 118 are shown in FIG. 2 as an example, any number of flush lines 118 can be used. Furthermore, flush lines 118 can be in the form of another structure or delivery system for transmitting coolants. To prevent liquid coolants of coolant pipe 114 from splashing and/or leaking into other areas of assembly 100 when passing through distributor 110, a splash cover 120 can be coupled to distributor 110. Splash cover 120 can be shaped to house coolant pipe 114 therein. Splash cover 120 can be composed of a material such as a glass, a metal, a plastic, and/or any other type of material which blocks the flow of fluids therethrough.

Returning to FIG. 2, assembly 100 can also include two or more acoustic shields 122 coupled to fibrous medium 102 and proximal to distributor 110. Acoustic shields 122 can suppress acoustic waves which may otherwise circumvent assembly 100 and travel from a noise-generating component (e.g., compressor 16 (FIG. 1) of power generation system 10 (FIG. 1)) or other components and systems outside power generation system 10). Acoustic shields 122 may include a shape and material composition which suppresses acoustic waves, reducing their magnitude between, e.g., approximately ten and approximately twenty decibels (dB). Acoustic shields 122 including solid surfaces can also suppress acoustic waves, e.g., by reflection, suppression, etc., without the acoustic waves reaching coolant supply system 108 or components located beyond the position of assembly 100. Some materials from which acoustic shields 122 can be constructed include by non-limiting example: foam materials, plastics, acrylic fibers, combinations of these materials, and/or other acoustic suppression materials which are either currently known or later developed. Acoustic shields 122 can enclose coolant pipe and distributor 110, and can be free of passages therein. The solid surface structure of acoustic shields 122 can also reflect or block the flow of fluid 104.

Assembly 100 can also include a partition 124 for dividing fibrous material 102 into several portions. Partition 124 may be composed of any material which blocks the flow of fluid 104, and in a particular embodiment can be composed of the same material as acoustic shields 122, or another type of acoustic shielding material. Although a single coolant supply system 108 is shown in FIGS. 2 and 3 for the purposes of illustration, it is understood that a single assembly 100 may have multiple coolant supply systems 108 if desired. In addition or alternatively, assembly 100 can also include multiple distributors 110 and/or coolant pipes 114. Each distributor 110 and/or coolant pipe 114 can distribute liquid coolant to different sections of fibrous medium 102 separated by partitions 124. In some cases, multiple coolant supply systems 108 can provide coolants to the same assembly 100. In this case, portions of fibrous medium 102 (e.g., divided by partitions 124) can be coupled to a corresponding coolant supply system 108 and/or one section of a larger coolant supply system 108, if desired. Multiple coolant supply systems can be used, e.g., to control the amount of liquid coolants provided to different sections of fibrous medium 102 to received different levels of cooling.

A collection trough 126 can be positioned underneath fibrous medium 102 to collect liquid coolants, including unevaporated coolants, which may be reused for assembly 100 and/or other components. Collection trough 126 may be in fluid communication with fibrous medium 102, and in a particular embodiment can collect predetermined amount of liquid coolant. As coolants are distributed throughout fibrous material 102 by distributor 110, coolants can descend through fibrous medium 102 in response to gravitational force. Unevaporated liquid coolants can settle within collection trough 126. In alternative embodiments, collection trough 126 can include, e.g., a selectively activated vacuum to provide suction for collecting liquid coolants from fibrous medium 102. To couple collection trough 126 to coolant supply system 108 and/or other components, collection trough 126 can optionally include plumbing components such as drains, pipes, pumps, etc. (not shown) coupled thereto for relaying the coolant to other components. In an example embodiment, a pump and conduit can transmit coolant from collection trough 126 to intake line 116. In another example embodiment, flush lines 118 can lead to collection trough 126 to mix unused coolant with unevaporated liquid coolants, which may be delivered back to coolant pipe 114 or sent elsewhere.

Figure 4:
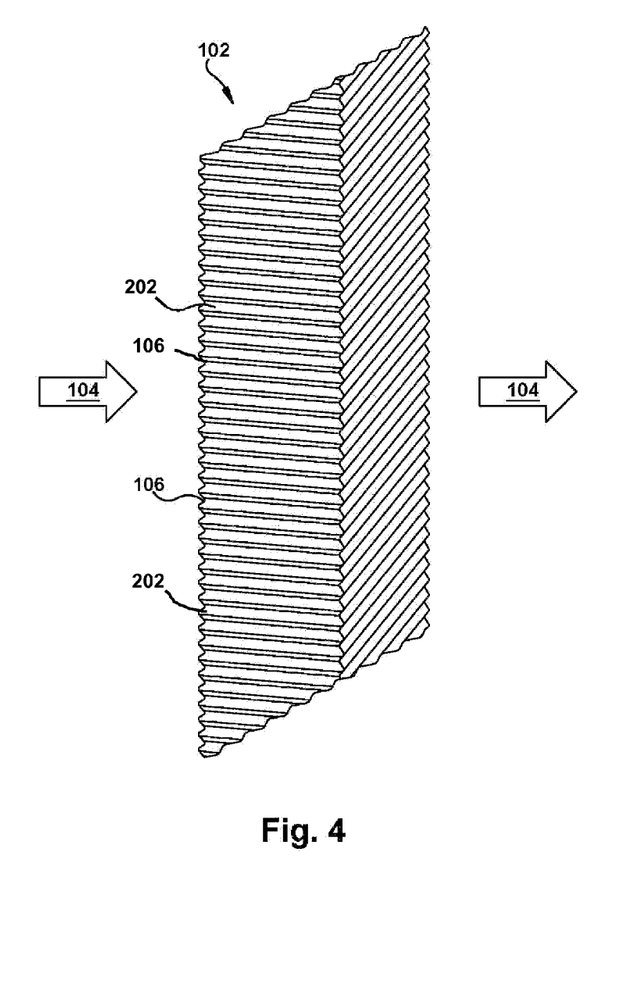
FIG. 4 is a perspective partial view of a fibrous medium composed of sheets according to an embodiment of the present disclosure.

Turning to FIG. 4, an embodiment of fibrous medium 102 composed of several sheets 202 is shown. Each sheet 202 can be composed of one or more of the example fibrous substances discussed herein, to provide attenuation of acoustic waves travelling through substantially corrugated fibrous medium 102. Substantially corrugated channels 106 can be positioned between two or more sheets 202, and fluid 104 can flow through substantially corrugated channels 106. In an example embodiment, several sheets 202 can be stacked together, with substantially corrugated channels 106 being present as gaps between the various sheets, to form fibrous medium 102. Arranging several sheets 202 in a stack to form fibrous medium 102 can allow a user and/or manufacturer of assembly 100 to add or remove sheets of fibrous medium 102 as desired to change the level of suppression and/or cooling provided in assembly 100.

Figure 5:
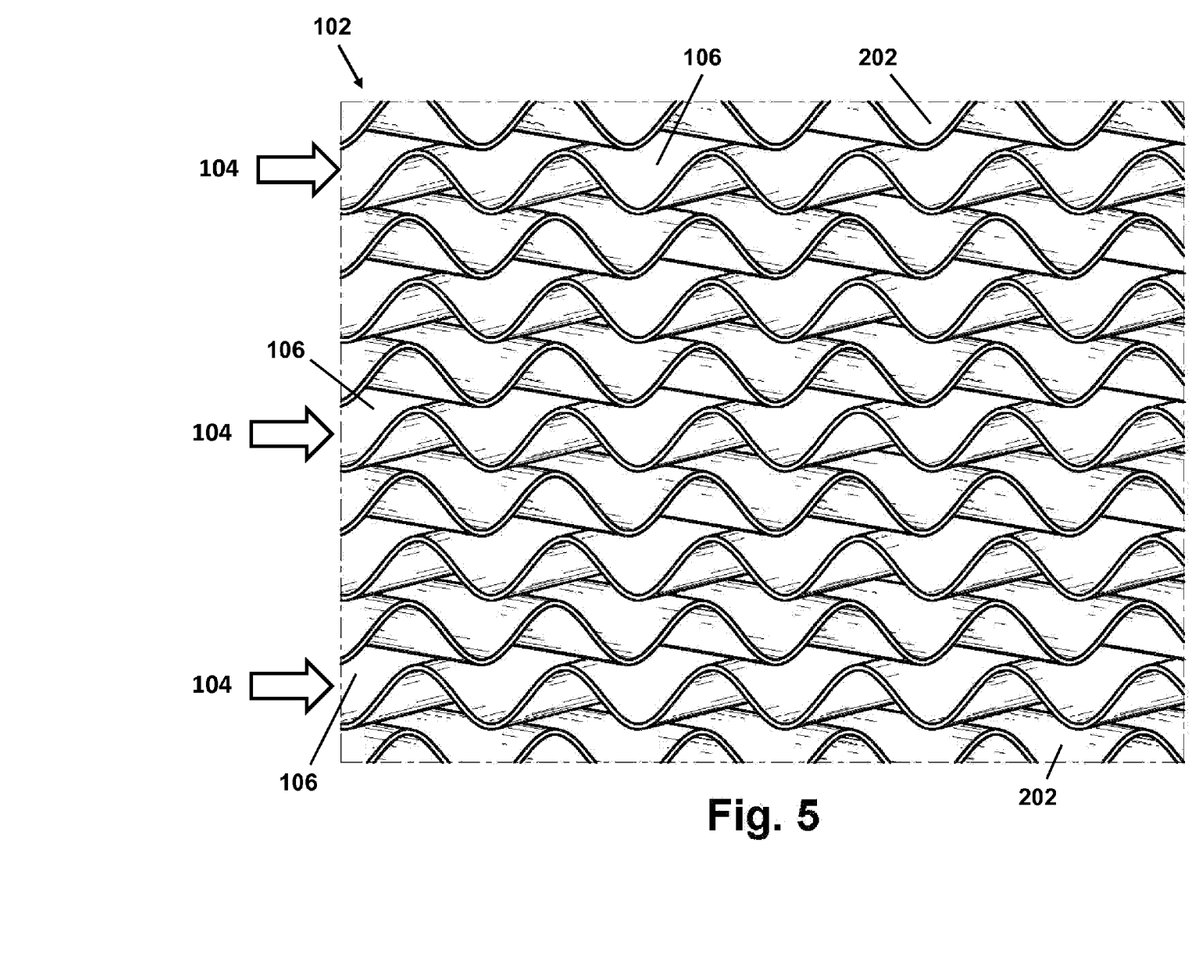
FIG. 5 is a cross-sectional view of a fibrous medium with channels between sheets according to an embodiment of the present disclosure.

Substantially corrugated channels 106 between sheets 202 of fibrous medium 102 are shown in further detail in FIG. 5. Each sheet 202 of fibrous medium 102 can include a surface with a profiled shape (e.g., curved, sinusoidal, irregular, etc.). The surfaces of sheets 202 can contact each other at particular points to create substantially corrugated channels 106 between two contacting sheets 202. Fluid 104 can flow into substantially corrugated channel 106 (e.g., into the plane of FIG. 5) between sheets 202 to pass through fibrous medium 102. The substantially corrugated shape of substantially corrugated channels 106 can create multiple reflections of sound waves to increase the absorption of acoustical energy or otherwise block the transmission of acoustic waves (i.e., sound) through fibrous medium 102 and assembly 100. In an embodiment, substantially corrugated channel 106 can be free of complete "lines of sight" for acoustic waves to pass through. Sheets 202 can be synthesized, manufactured, etc. from other materials (e.g., by fiber fractionation or chemical processes) to have a surface with a particular curvature, such that each substantially corrugated channel 106 provides a predetermined amount of acoustic suppression (e.g., a particular acoustic transmission loss in decibels) for each sheet 202. In a mathematical example discussed elsewhere herein, acoustic suppression properties of fibrous medium 102 are discussed.

The curvature of substantially corrugated channels 106 can also reduce the amount of drag on fluid 104 flowing through assembly 100 as compared to conventional evaporative media. For example, the size and configuration of substantially corrugated channels 106 may have a minimal effect on fluid velocity and/or fluid flow therethrough, while providing multiple surfaces for reflecting, and therefore reducing, the amplitude of acoustic waves. Increasing the curvature of sheets 202 can increase the amount of acoustic attenuation, but this increase may come at the expense of increasing drag on fluid 104 within substantially corrugated channels 106. The appropriate level of noise attenuation and/or frictional drag on fluids 104 passing therethrough may be specific to a particular machine and/or application. However, embodiments of the present disclosure with substantially corrugated channels 106 can provide at least significant acoustic suppression regardless of material, shape, etc., as shown in a mathematical model of assembly 100 herein.

Figure 6:
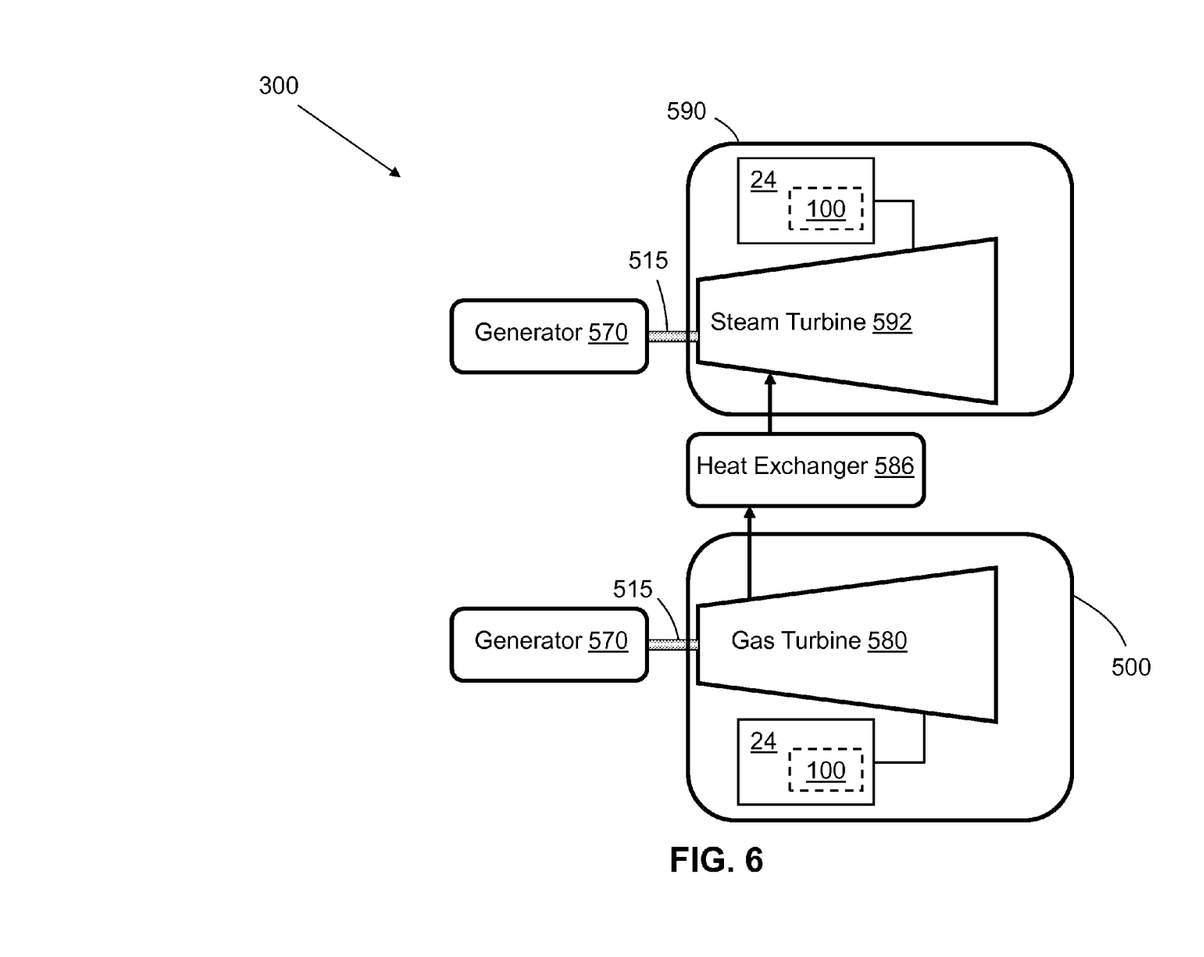
FIG. 6 is a schematic view of portions of a multi-shaft combined cycle power plant according to an embodiment of the present disclosure.
Figure 7:
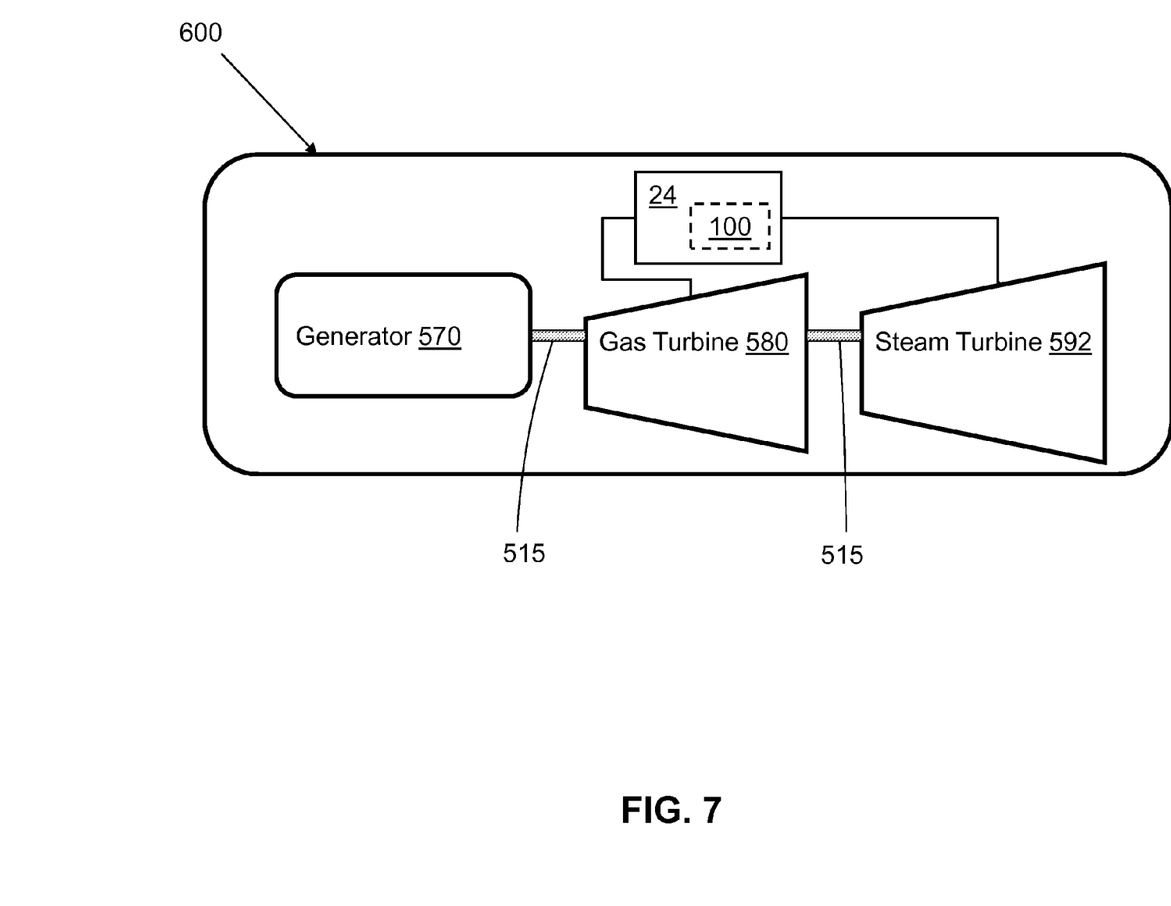
FIG. 7 is a schematic view of portions of a single-shaft combined cycle power plant according to embodiments of the present disclosure.

Turning to FIG. 6, a schematic view of a multi-shaft combined-cycle power plant 300 is shown. Combined-cycle power plant 300 may include, for example, a gas turbine system 500 including a gas turbine 580 operably connected to a generator 570. Generator 570 and gas turbine 580 may be mechanically coupled by a shaft 515, which may transfer energy between a drive shaft (not shown) of gas turbine 580 and generator 570. As also shown in FIG. 6, heat exchanger 586 can be operably connected to gas turbine 580 and a steam turbine system 590. Heat exchanger 586 may be fluidly connected to both gas turbine 580 and a steam turbine 592 of steam turbine system 590 via conventional conduits (numbering omitted). Heat exchanger 586 may be a conventional heat recovery steam generator (HRSG), such as those used in conventional combined-cycle power systems. As is known in the art of power generation, HRSG 586 may use hot exhaust from gas turbine 580, combined with a water supply, to create steam which is fed to steam turbine 592. Steam turbine 592 may optionally be coupled to another generator system 570 (via another shaft 515). It is understood that generators 570 and shafts 515 may be of any size or type known in the art and may differ depending upon their application or the system to which they are connected. Common numbering of the generators and shafts is for clarity and does not necessarily suggest these generators or shafts are identical. Each generator system 570 and shaft 515 may operate on substantially similar principles and/or exhibit substantially the same behaviors. One or more systems and/or elements of combined cycle power plant 300 can be adapted to include assembly 100 for suppressing acoustic waves and/or cooling any fluids therein. In one embodiment of the present invention (shown in phantom), gas turbine system 500 and/or steam turbine system 590 may be retrofitted with assembly 100, e.g., within passage 24. In another embodiment, shown in FIG. 7, a single-shaft combined-cycle power plant 600 may include a single generator 570 coupled to both gas turbine 580 and steam turbine 592 via a single shaft 515. Single-shaft combined-cycle power plant 600 and/or elements therein may be retrofitted to include an embodiment of assembly 100, e.g., within passage 24.

As discussed herein, embodiments of assembly 100 can provide cooling and acoustic suppression to power generation system 10 (FIG. 1), combined-cycle power plant 300 (FIGS. 6, 7), and/or other machinery or components where noise suppression and temperature cooling may be desired. The acoustic suppression features of assembly 100 are discussed in further detail by reference to a mathematical example.

The performance of assembly 100 with fibrous medium 102 according to embodiments of the present disclosure can be verified with mathematical models. A particular material's ability to suppress acoustic waves can be expressed in terms of "flow resistivity," ($R_1$) which may depend in part on the diameter of fibers in a fibrous material, in addition to the material's density. In the following example, fibrous medium 102 is assumed to have a fiber diameter of approximately fifteen μm and a bulk density of approximately two hundred kg/m$^3$. Flow resistivity of a material to acoustic waves may be defined by either of the formulas:

$$R_1 = (26)(\rho_{bulk}^{1.404})/(D^2)$$

$$R_1 = (3450)((\text{SpGrGlass}/\text{SpGrFiber})(\rho_{bulk}^{1.53})/(D^2)$$

where "D" represents the fiber diameter of fibrous medium 102 in micrometers, $\rho_{bulk}$ represents the bulk density of fibrous medium 102 in kg/m$^3$, "SpGr" is an abbreviation for the unitless specific gravity a particular material, and $R_1$ represents flow resistivity in MKS Rayls per meter ("MKS Rayl/m"). In the example discussed herein, the flow resistivity of fibrous medium 102 is determined to be 50,840 MKS Rayl/m.

Other mathematical descriptors of a material's effect on an acoustic wave depend in part on the frequency of the sound being transmitted. In the present example, two acoustic suppression characteristics, the "propagation constant" of acoustic waves through fibrous medium 102 and the "acoustic impedance" of fibrous medium 102 illustrate the amount of wave propagation and acoustic suppression that fibrous medium 102 provides for a particular wave. These measurements can be derived from the calculated flow resistivity, discussed above, and the frequency of a propagated acoustic wave. The propagation constant measures the amplitude of an acoustic wave as the wave propagates through a particular material. The acoustic impedance generally measures the suppressing reaction of fibrous medium 102 to sound waves therein at a particular frequency, and can be expressed in terms of MKS Rayls per square meter ("MKS Rayl/m$^2$"). These constants include a magnitude and frequency, and for a group of "n" materials can be expressed by equations in the complex domain:

$$K_{an}(\text{propagation constant}) = k/k_0 = (1+(a'')E^{-\alpha''}) - j(a')E^{-\alpha'}$$

$$Z_{Cn}(\text{acoustic impedance}) = Z_C/Z_0 = (1+(b')E^{-\beta'}) - j(b'')E^{-\beta''}$$

where "E" (also known as sound energy density) is defined as $((f)(\rho_0)/R_1)$, "f" represents the sound frequency in Hertz ("Hz") (1/second), "j" represents an imaginary number (i.e., the square root of −1), "$k_0$" is defined as $(\omega/c_0)$, "ω" represents the angular sound frequency in radians per second (rad/second), and "$\rho_0$" and "$c_0$" represent the density and sound speed of air, respectively. The remaining constants α', α", β', and β" are predetermined regression coefficients, and can be determined for illustrative known materials by reference to the following tables:

| Material | E Region | b' | β' | b" | β" | a" | α" | a' | α' |
|---|---|---|---|---|---|---|---|---|---|
| Mineral and basalt wool | E ≤ 0.025 | 0.081 | 0.0699 | 0.191 | 0.556 | 0.136 | 0.641 | 0.322 | 0.502 |
| | E > 0.025 | 0.0563 | 0.725 | 0.127 | 0.655 | 0.103 | 0.716 | 0.179 | 0.663 |
| Glass fiber | E ≤ 0.025 | 0.0668 | 0.707 | 0.196 | 0.549 | 0.135 | 0.646 | 0.396 | 0.458 |
| | E > 0.025 | 0.0215 | 0.887 | 0.0875 | 0.770 | 0.102 | 0.705 | 0.179 | 0.674 |

| Material | b' | β' | b" | β" | a' | α' | a" | α" |
|---|---|---|---|---|---|---|---|---|
| Polyester fiber | 0.159 | 0.571 | 0.121 | 0.530 | 0.078 | 0.623 | 0.074 | 0.660 |

For fibrous medium 102, the propagation constant and acoustic impedance can alternatively be calculated by the following equations, using several of the same variables but without relying on regression coefficients:

$$k_{an} = \frac{k}{k_0} = 1 + 0.109\left(\frac{\rho_0 f}{R_1}\right)^{-0.618} - j0.160\left(\frac{\rho_0 f}{R_1}\right)^{-0.018}$$

$$Z_{Cn} = \frac{Z_C}{Z_0} = 1 + 0.070\left(\frac{\rho_0 f}{R_1}\right)^{-0.612} - j0.107\left(\frac{\rho_0 f}{R_1}\right)^{-0.632}$$

where "$R_1$" represents the calculated flow resistivity of fibrous medium 102, "$\rho_0$" represents the density of air, "f" represents the sound frequency in Hertz, and "j" represents an imaginary number. Applying the frequency of a sound wave and a material's properties (e.g., fiber diameter and density) to these equations provides the propagation constant and acoustic impedance for the acoustic wave being modeled. By referring to the properties of fibrous medium 102 discussed above and the frequency of a particular sound wave, the propagation constant and acoustic impedance of fibrous medium 102 are defined mathematically. As discussed herein, these quantities can be used to derive the transmission loss of an acoustic wave through fibrous medium 102.

The pressure field of acoustic waves within fibrous medium 102 can be used with the propagation constant and acoustic impedance of fibrous medium 102 to determine a total transmission loss of acoustic waves through fibrous material 102. Acoustic pressure "p" is a function of a wave's position and time of travel through fibrous medium 102, measured in Pascals (Pa), or Newtons per meter squared (N/m²) and generally describes the strength of the acoustic wave at a particular position and time.

Figure 8:
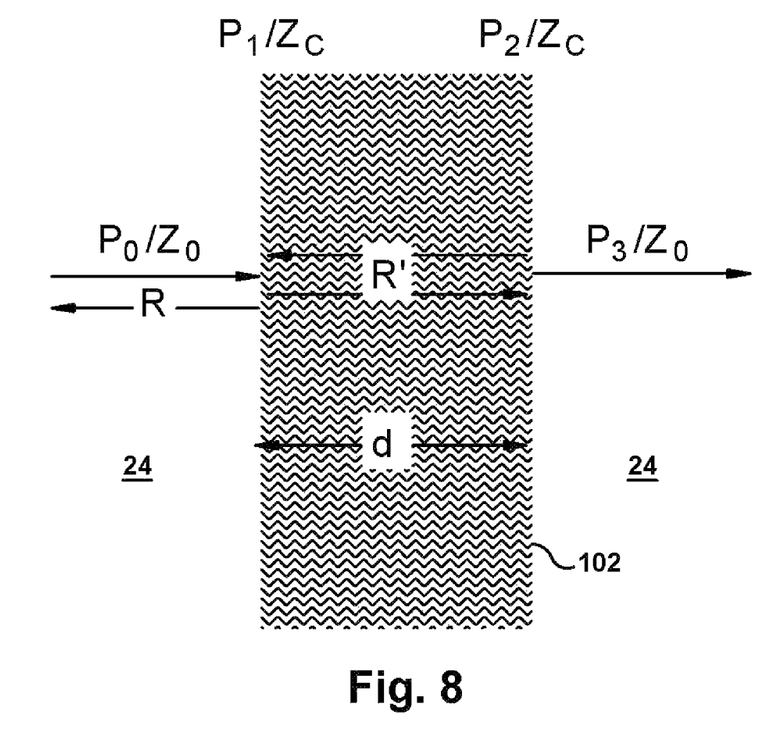
FIG. 8 is a schematic diagram of acoustic wave behavior in a fibrous medium according to an embodiment of the present disclosure.

Turning to FIG. 8, these equations can be applied to fibrous material 102 of assembly 100 with two sides to determine the magnitude of acoustic suppression within fibrous material 102 relative to external substances. Acoustic waves may enter fibrous material 102 from one direction and continue to propagate through fibrous medium 102 substantially along that direction. Some acoustic waves may propagate through fibrous material 102 and exit an opposing side, while others may be reflected from the opposing side of fibrous material 102 where acoustic waves would exit. Where acoustic wave velocity is defined as the acoustic pressure field over the characteristic impedance of the medium through which an acoustic wave travels, the total acoustic resistance "R" of fibrous medium 102 can be defined as:

$$R = \frac{Z_C - Z_0}{Z_C + Z_0}$$

where "$Z_c$" represents the characteristic impedance of fibrous medium 102, as derived elsewhere herein, and "$Z_0$" represents the characteristic impedance of the medium outside fibrous medium 102, which in embodiments of the present disclosure can be air. As is also discussed, the characteristic impedance of fibrous medium 102 and the external material is dependent on the frequency of the acoustic waves being propagated. Converting the characteristic impedance of fibrous medium 102 and the adjacent medium (e.g., passage in FIG. 8) to complex form (i.e., $Z_C = Z_0(a-jb)$) by the relationships discussed above yields the following relationship:

$$R = \frac{a^2 + b^2 - 1 - j2b}{(a+1)^2 + b^2}$$

Where "a" represents the magnitude of a real component and "b" represents the magnitude of an imaginary component. The generalized expression of "R" in complex form is provided by summing the real and imaginary parts of $Z_c$ and $Z_0$ in the numerator, and subtracting the real and imaginary parts of $Z_0$ from $Z_c$ in the denominator. As is discussed elsewhere herein, the resulting acoustic resistance R measures the total acoustic resistance of the fibrous medium 102 in complex form based relative to the outside material (e.g., air) to acoustic waves traveling therethrough. The acoustic resistance R can be combined with the resistance of fibrous medium 102 to reflected waves, as discussed herein, to determine the transmission loss of fibrous medium 102.

For acoustic waves reflected from the exit interface between fibrous medium 102 and the external medium (e.g., passage in FIG. 8), the total acoustic resistance for reflected acoustic waves (R') can similarly be expressed in complex form (with "a" being the magnitude of an real component and "b" being the magnitude of an imaginary component) as:

$$R' = \frac{1 - a^2 - b^2 + j2b}{(a+1)^2 + b^2} = -R$$

which is the same as the resistance for non-reflected acoustic waves, but with a phase difference of 180°. This phase difference between the two expressions is a result of the acoustic waves having been reflected before traveling through fibrous medium 102 against an acoustic resistance of R'.

The total acoustic resistance of fibrous medium 102 can mathematically indicate the sound pressure of acoustic waves entering and leaving fibrous material 102. Using this relationship between acoustic waves which propagate through fibrous medium 102 and reflected acoustic waves, the magnitude of acoustic pressure decrease (e.g., the magnitude of acoustic pressure for waves entering fibrous medium 102 ($P_1$)

over the magnitude of acoustic pressure for waves in air before reaching fibrous medium 102 ($P_0$) can be expressed as an "absorption coefficient" α:

$$\alpha=(P_1/P_0)^2=(P_3/P_2)^2=1-|R|^2$$

As shown in FIG. 8, $P_3$ represents the acoustic pressure of waves after leaving fibrous medium 102, and $P_2$ represents the acoustic pressure of waves reaching the opposing side of fibrous medium 102. Using absorption coefficient α, the total transmission loss provided by fibrous medium 102 can be derived mathematically by use of the propagation constant, derived elsewhere herein, where the subscript "re" designates a real component of a variable and the subscript "im" designates an imaginary component of the propagation constant (which in turn is dependent on the frequency of an acoustic wave as discussed herein). The variable "d" denotes the fiber diameter of fibrous medium 102, and "α" represents the absorption coefficient defined herein:

$$(P_2/P_1)=e^{\wedge}((-k_0)(k_{im})(d))$$

$$K=k_0(k_{re}-jk_{im})$$

$$TL=10 \log((\alpha^2)e^{-2k_0 k_{im}d})$$

where "TL" represents the transmission loss of an acoustic wave through fibrous medium 102, in decibels. Although the models for transmission loss discussed herein do not include variables representing multiple reflections of an acoustic wave within fibrous medium 102, the effect of these variables on the resulting transmission loss through fibrous medium 102 may be negligible.

Figure 9:
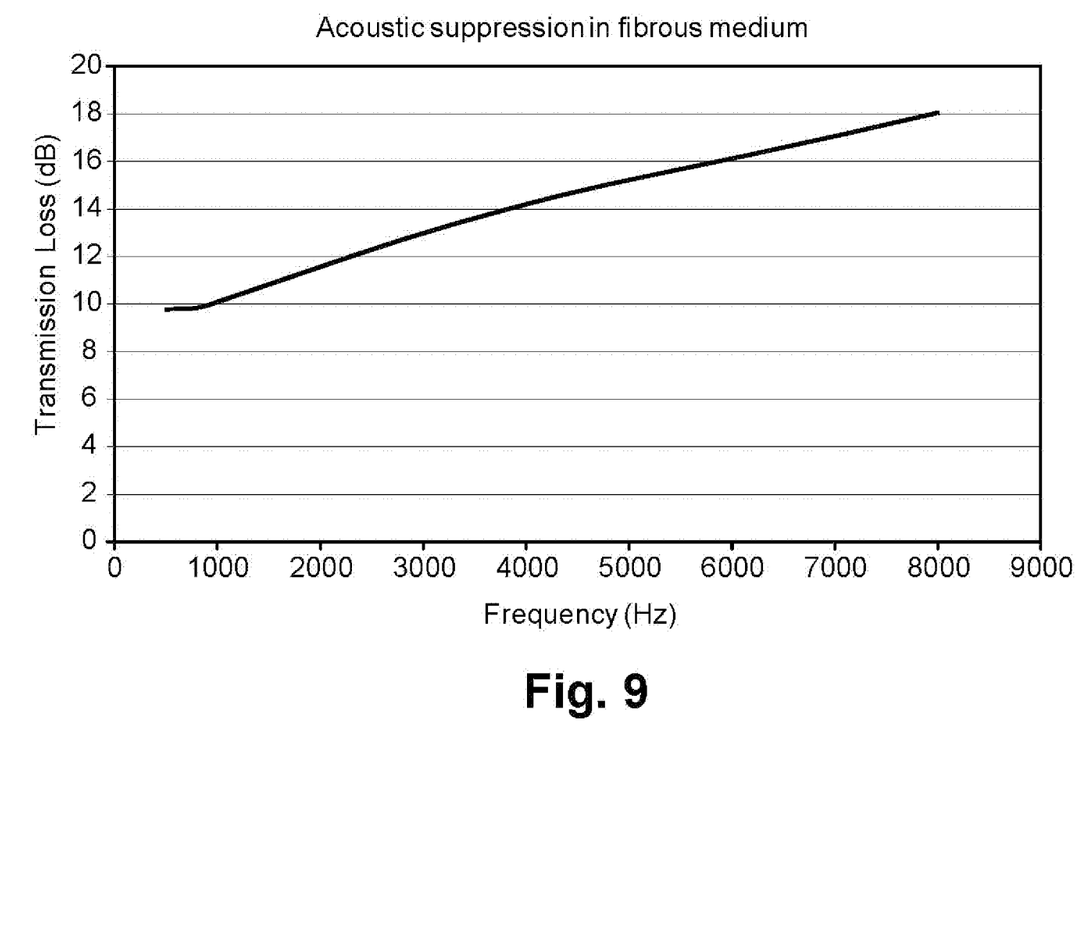
FIG. 9 is a plot of acoustic suppression in a fibrous medium according to an embodiment of the present disclosure.

In the present example, fibrous medium 102 can have a depth of approximately 46 centimeters (cm), and for analysis purposes can be assumed to have an "effective depth" (i.e., distance across which acoustic waves are suppressed) of approximately 3.0 centimeters. For frequencies between approximately zero kHz and approximately eight kHz, the transmission loss is shown in the plot of FIG. 9 to be between approximately ten decibels (dB) and approximately eighteen dB. Embodiments of assembly 100 within passage 24 can provide acoustic suppression to the degree indicated by the mathematical examples discussed herein. For example, fibrous medium 102 with two sides can resist the flow of acoustic waves therethrough, and some acoustic waves may be reflected before exiting fibrous medium 102. However, fluids within passage 24 can pass through substantially corrugated channels 106 without experiencing and increased drag force, despite the shape of substantially corrugated channel 106 being designed to suppress acoustic waves. In general, any passage 24 within a mechanical system and/or component, such as power generation system 10 (FIG. 1), combined-cycle power plant 300 (FIGS. 6, 7) can include an embodiment of assembly 100 with fibrous medium 102 therein to suppress acoustic waves and provide cooling to fluids passing through a particular passage. In addition, acoustic shields (e.g., acoustic shields 124 (FIGS. 2, 3)) can be added to provide additional blocking of acoustic waves where flow of fluids 104 through assembly 100 is not desired. All of these acoustic suppression features can be concurrent with the cooling provided by assembly 100 discussed herein. Thus, technical effects of assembly 100 can include a single component which suppresses acoustic waves from within a power generation system while cooling fluids which flow through the same power generation system.

The apparatus and method of the present disclosure is not limited to any one particular gas turbine, steam turbine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly comprising:
    a fibrous medium having a plurality of substantially corrugated channels therein, the plurality of substantially corrugated channels being permeable to a flow of fluid therethrough;
    a distributor in contact with the fibrous medium, and including an aperture therein for transmitting a liquid coolant through the distributor; and
    at least two acoustic shields coupled to the fibrous medium and proximal to opposing sides of the distributor such that the at least two acoustic shields enclose the distributor therebetween, wherein the at least two acoustic shields are free of passages therein.

2. The assembly of claim 1, further comprising a coolant collection trough in fluid communication with the fibrous medium.

3. The assembly of claim 1, further comprising a coolant pipe coupled to the distributor and having a flush valve therein, wherein the flush valve selectively restricts and permits a flow of the liquid coolant from the assembly.

4. The assembly of claim 1, further comprising a splash cover coupled to the distributor.

5. The assembly of claim 1, wherein the fibrous medium has a density of between approximately 40 kilograms per cubic meter (kg/m$^3$) and approximately 450 kg/m$^3$.

6. The assembly of claim 1, wherein a curvature of one of the plurality of substantially corrugated channels suppresses a transmission of sound therethrough.

7. The assembly of claim 1, wherein the fibrous medium includes a plurality of fibrous sheets arranged in a stack.

8. A turbine component comprising:
    a passage configured to transmit a flow of air from a compressor;
    a fibrous medium positioned within the passage, the fibrous medium having a plurality of substantially corrugated channels therein, wherein each of the plurality of substantially corrugated channels is permeable to the flow of air;
a distributor in contact with the fibrous medium, and including an aperture therein for transmitting a liquid coolant through the distributor; and
at least two acoustic shields coupled to the fibrous medium and proximal to opposing sides of the distributor such that the at least two acoustic shields enclose the distributor therebetween, wherein the at least two acoustic shields are free of passages therein.

9. The turbine component of claim 8, further comprising a coolant collection trough in contact with the fibrous medium.

10. The turbine component of claim 8, wherein a curvature of one of the plurality of substantially corrugated channels suppresses a transmission of sound therethrough.

11. The turbine component of claim 8, further comprising a splash cover coupled to the distributor.

12. The turbine component of claim 8, wherein the fibrous medium has a density of between approximately 40 kilograms per cubic meter ($kg/m^3$) and approximately 450 $kg/m^3$.

13. The turbine component of claim 8, wherein the flow of the compressed air through the fibrous medium contacts and evaporates a portion of the liquid coolant within the fibrous medium.

14. The turbine component of claim 8, wherein the fibrous medium includes a plurality of fibrous sheets arranged in a stack.

15. A combined cycle power generation system comprising:
an assembly positioned within a fluid flow section one of a gas turbine, a heat recovery stream generator (HRSG), and a steam turbine, the assembly including:
a fibrous medium having a plurality of substantially corrugated channels therein, the substantially corrugated channels being permeable to a flow of fluid therethrough,
a distributor in contact with the fibrous medium, and including an aperture therein for transmitting a liquid coolant through the distributor; and
at least two acoustic shields coupled to the fibrous medium and proximal to opposing sides of the distributor such that the at least two acoustic shields enclose the distributor therebetween, wherein the at least two acoustic shields are free of passages therein.

16. The system of claim 15, wherein the flow of fluid through the fibrous medium contacts and evaporates a portion of the liquid coolant within the fibrous medium.

17. The system of claim 15, wherein a curvature of one of the plurality of substantially corrugated channels suppresses a transmission of sound therethrough.

18. The system of claim 15, further comprising a splash cover coupled to the distributor.

19. The system of claim 15, wherein the fibrous medium has a density of between approximately 40 kilograms per cubic meter ($kg/m^3$) and approximately 450 $kg/m^3$.

20. The system of claim 15, wherein the fibrous medium comprises a plurality of fibrous sheets arranged into a stack.

* * * * *